United States Patent [19]

Makita

[11] 4,425,992

[45] Jan. 17, 1984

[54] SYSTEMS FOR PREVENTING OVERHEAT OF ELECTROMAGNETIC CLUTCH FOR VEHICLES

[75] Inventor: Fujio Makita, Hachioji, Japan

[73] Assignee: Fuji Jukogyo Kabushiki Kaisha, Tokyo, Japan

[21] Appl. No.: 290,986

[22] Filed: Aug. 7, 1981

[30] Foreign Application Priority Data

Aug. 15, 1980 [JP] Japan ................. 55-112804

[51] Int. Cl.$^3$ .................. F16D 27/02; F16D 29/00
[52] U.S. Cl. .................. 192/82 T; 192/0.076; 192/21.5
[58] Field of Search .......... 192/0.076, 3.56, 21.5, 192/82 T, 40, 84 E, 52

[56] References Cited

U.S. PATENT DOCUMENTS 3,163,272 12/1964 Bauman .................. 192/3.56 X
3,184,024 5/1965 Aschauer .................. 192/82 T

FOREIGN PATENT DOCUMENTS

993631 6/1965 United Kingdom .............. 192/3.56

*Primary Examiner*—Rodney H. Bonck
*Attorney, Agent, or Firm*—Martin A. Farber

[57] ABSTRACT

A system for preventing overheat of an electromagnetic clutch of an internal combustion engine mounted on a vehicle, which has a drive member secured to a crankshaft of the internal combustion engine, magnetizing coil provided in the drive member, a driven member adjacent to the drive member, and a transmission secured to the driven member. A detecting circuit is provided for detecting the temperature of the clutch for producing an electrical output. An electric circuit is provided to respond to the output of the detecting circuit for rapidly increasing the clutch current, so that the clutch is entirely engaged in a short time, whereby the overheat by slippage of the clutch may be prevented.

3 Claims, 10 Drawing Figures

SYSTEMS FOR PREVENTING OVERHEAT OF ELECTROMAGNETIC CLUTCH FOR VEHICLES

BACKGROUND OF THE INVENTION

The present invention relates to a system for preventing overheat of an electromagnetic clutch for vehicles, and more particularly to a system for preventing overheat of the electromagnetic clutch as a result of the slippage of the clutch by increasing the clutch current passing through a magnetizing coil of the electromagnetic clutch in proportion of elevation of the temperature of the clutch for decreasing friction in the clutch.

In the electromagnetic clutch, the clutch current flows through a coil to provide an electromagnetic field, so that two members in the transmitting system are connected magnetically with each other to transmit the power from the engine to the transmission. An electromagnetic powder clutch is a form of the above-mentioned electromagnetic clutch.

The electromagnetic powder clutch comprises an annular drive member secured to the crankshaft of an engine, a magnetizing coil provided in the drive member, a driven member installed on the input shaft of the transmission leaving a small gap from the drive member, and a shift lever for changing the gear in the transmission. The shift lever is provided with a switch for the magnetizing coil, which is actuated by operating the shift lever. When the shift lever is shifted to the gear engaging position, the switch is closed making the electric current flow through the magnetizing coil to magnetize the drive member. As the accelerator pedal is depressed, the current applied to the coil increases. The magnetic powder is aggregated in the gap between the drive member and the driven member, bringing about a connection between drive member and driven member. The clutch current passing through the magnetizing coil is progressively increased according to how far the accelerator pedal is depressed, while the clutch slips between the drive member and the driven member.

More particularly, the system is arranged to provide a small clutch current at the start of the vehicle so as to transmit the power in a partial engagement clutch condition, to thereby abate the shock caused by abrupt engagement of the clutch and to prevent the engine-stop. The clutch current is varied with a functional relationship to the engine speed. However, if the electromagnetic clutch slides, keeping the partial engagement condition for a long period, the temperature of the clutch and hence temperature of the coil rise, which causes an increase of the resistance of the coil. In inverse proportion to the increase of coil resistance, clutch current and clutch torque are decreased causing the extension of clutch sliding duration. The longer sliding duration, the higher clutch temperature.

SUMMARY OF THE INVENTION

The object of the present invention is to provide a system which may prevent the overheat of the electromagnetic clutch in the partial engagement condition.

According to the present invention, there is provided a system for preventing overheat of an electromagnetic clutch for an internal combustion engine mounted on a vehicle, which has a drive member secured to a crankshaft of the internal combustion engine, a magneticing coil provided in the drive member, a driven member adjacent to the drive member, and a transmission secured to the drive member, comprising detecting means for detecting the temperature of the clutch for producing an electrical output signal relative to the temperature; circuit means for controlling the clutch current passing through the coil so as to increase with the increase of the engine speed; and a correcting circuit responsive to the output signal from the detecting means for rapidly increasing the clutch current.

DETAILED DESCRIPTION OF THE PREFERRED EMBODIMENTS

Figure 1:
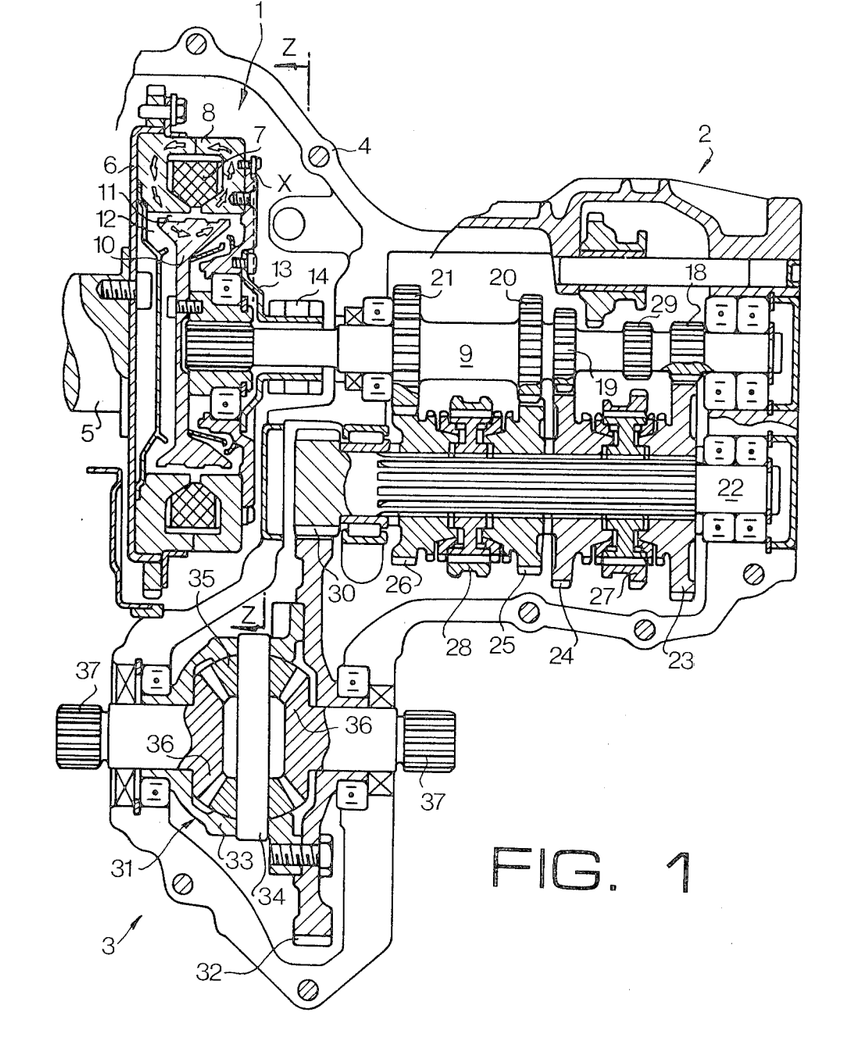
FIG. 1 is a sectional view of a transmission with an electromagnetic clutch used in a system according to the present invention.
Figure 2:
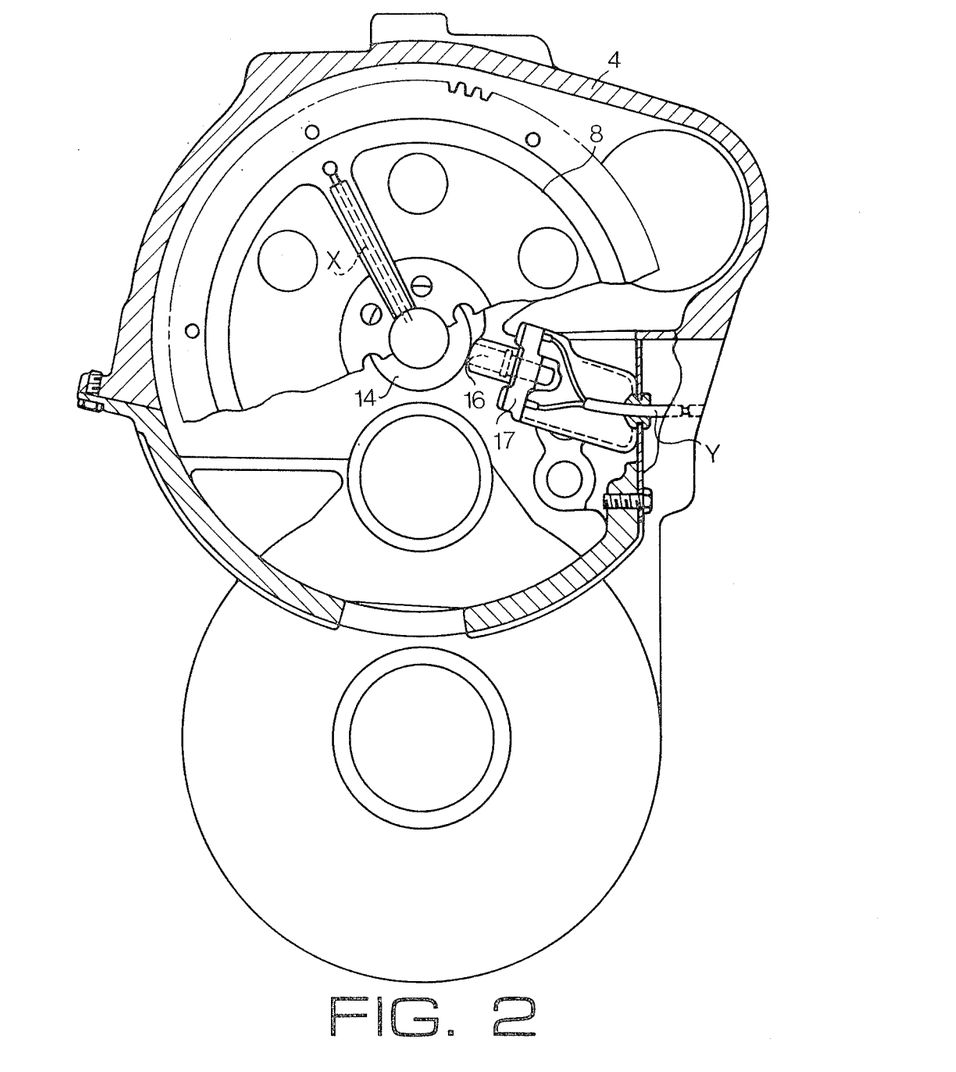
FIG. 2 is a sectional view taken along the line Z-Z of FIG. 1.

Referring to FIGS. 1 and 2 showing a transmission for a vehicle to which the present invention is applied, numeral 1 is an electromagnetic powder clutch, 2 is a four-speed transmission and 3 is a final reduction device.

The electromagnetic powder clutch 1 is provided in a clutch case and comprises a drive plate 6 attached to the end of a crankshaft 5 of an internal combustion engine, an annular drive member 8 secured to the drive plate 6, a magnetizing coil 7 provided in the drive member 8, and a driven member 10 secured by a spline engagement to an input shaft 9 of the transmission 2, leaving a gap 11 from the drive member 8.

Magnetic powder is provided in a powder chamber 12 and the gap 11 is adapted so as to be filled with the powder. A cap 13 is secured to the drive member 8. The cap 13 has a cylindrical portion coaxial with the input shaft 9, on which slip rings 14 are securely provided. Slip rings 14 are connected to the drive member 8 by a lead X. Brushes 16 pressed against slip rings 14 are supported in a holder 17 and connected to a hereinafter described control means by a lead Y.

In such a construction, the drive plate 6 and the drive member 8 rotate together with the crankshaft 5 and the magnetic powder sealed in the powder chamber 12 is drawn on the inner surface of the drive member 8 by centrifugal force. If the magnetizing coil 7 is excited by a current applied through lead Y, brushes 16, slip rings 14 and lead X, the drive member 8 is magnetized to produce a magnetic flux passing through the driven member 10 as shown by arrows in FIG. 1. Thus, the powder is aggregated in the gap 11, so that the power of the engine is transmitted to the input shaft 9 through the clutch.

In the transmission 2, 1st to 4th speed drive gears 18 to 21 are integrally provided on the input shaft 9. The drive gears 18 to 21 are engaged with driven gears 23 to 26, respectively. Driven gears 23 to 26 are rotatably mounted on the output shaft 22 parallel to the input shaft 9. Each of driven gears 23 and 24 is adapted to be engaged with the output shaft 22 by operating a synchromesh mechanism 27 and each of the driven gears 25 and 26 is engaged with the output shaft 22 by a synchromesh mechanism 28 in the conventional manner. Further, a reverse drive gear means 29 is provided. Thus, by operating the shift lever (not shown) of the transmission, the driven gear 23 is coupled integrally with the output shaft 22 by the synchromesh mechanism 27 and the 1st speed is obtained on the output shaft 22 because the power of output shaft 9 is greatly decreased, and the 2nd, 3rd and 4th speed may be respectively obtained accordingly.

Further provided on one end of the output shaft 22 is an output gear 30 which engages with a ring gear 32 in a differential 31 of the final reduction device 3 to transmit the output of the output shaft 22 of the transmission 2 directly from ring gear 32 to side gear 36 through a case 33, a spider 34 and a pinion 35, and further to driving wheels through wheel shaft 37.

In a conventional control system of the electromagnetic powder clutch, the clutch current is controlled in accordance with the engine speed.

Figure 3:
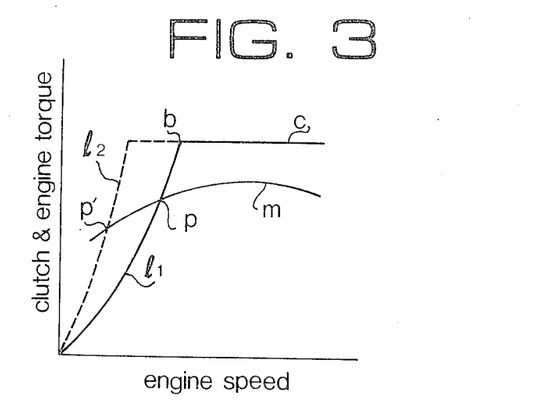
FIG. 3 is a graph showing the relationship between clutch torque characteristic and full throttle open torque of an engine.

When the car is driven through the 1st- or 2nd-gear, the clutch torque varies as shown in FIG. 3 by curve $l_1$ in accordance with the engine speed for smoother start of vehicle. Difference between the curve $l_1$ and curve m of the full throttle open engine torque (below point P) causes slippage of the clutch for smooth clutch engagement. When the clutch torque $l_1$ reaches point b which is the rated clutch torque c of the clutch, the clutch is perfectly engaged. On the other hand, when the car is driven through the 3rd- or 4th-gear, the clutch coupling torque varies to trace a curve $l_2$ having a steep inclination which is in an unsteady area with a low engine torque.

Figure 4:
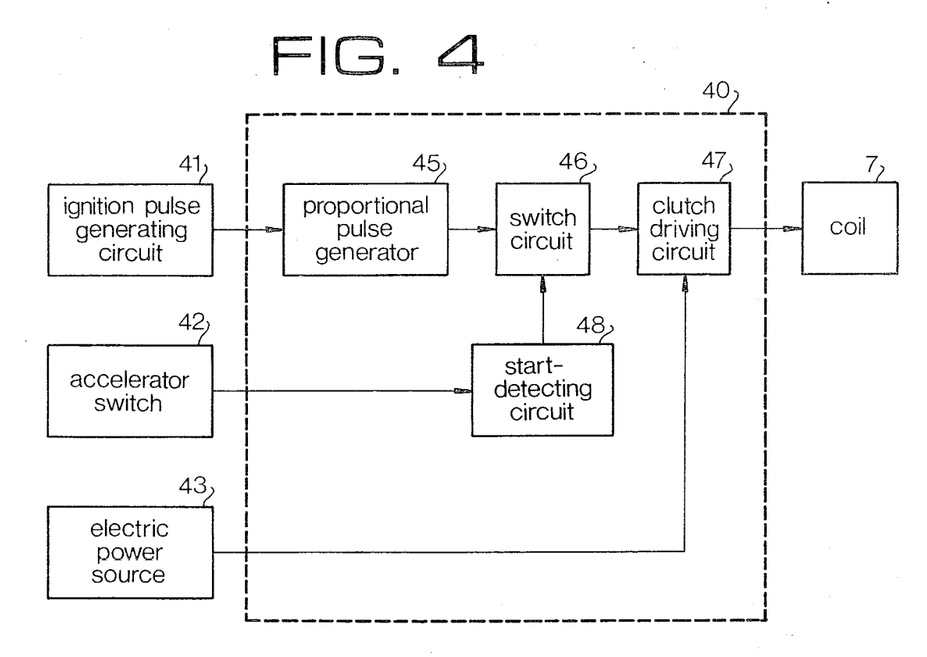
FIG. 4 is a block diagram showing a conventional control circuit.

FIG. 4 shows a conventional control system 40 for the above described clutch. An ignition pulse generating circuit 41 communicating with the ignition coil of the engine, an accelerator switch 42 which is actuated by depressing an accelerator pedal, and an electric power source 43 are provided for the control system. The ignition pulse generating circuit 41 is connected to a proportional pulse generator 45 which generates pulses having a predetermined pulse width at a pulse repetition rate which is in proportion to that of the input pulse. The pulse generator 45 is connected to a clutch driving circuit 47 through a switch circuit 46 which is turned on to pass the output from the generator 45. Output from the clutch driving circuit 47 is applied to the coil 7. The accelerator switch 42 is connected with a start-detecting circuit 48 for detecting the starting of the vehicle by the depression of accelerator pedal, and the output from the start-detecting circuit 48 is applied to the switch circuit 46. The electric power source 43 is communicated with the clutch driving circuit 47.

In the control system 40, proportional pulses from the pulse generator 45 pass the switch circuit 46, when the switch circuit is turned on by the signal from the start-detecting circuit 48. The clutch driving circuit 47 sends clutch current for a half engagement in accordance with the proportional pulses, which is less than rated clutch current to the coil 7. Thus, the electromagnetic powder clutch 1 reaches half engagement condition and transmits a torque smaller than the output torque of the engine. When the vehicle reaches a predetermined speed, the clutch driving circuit 47 sends rated clutch current to the coil 7 in spite of signals from proportional pulse generator 45 so as to entirely engage the electromagnetic powder clutch 1.

Figure 5:
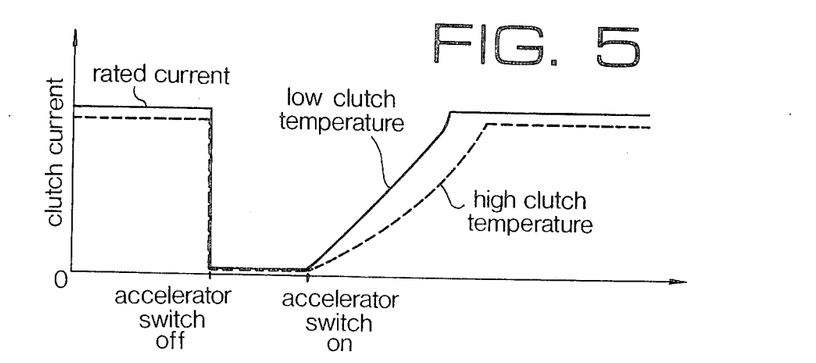
FIG. 5 is a graph showing the influence of the clutch temperature on clutch current of a conventional control system.
Figure 6:
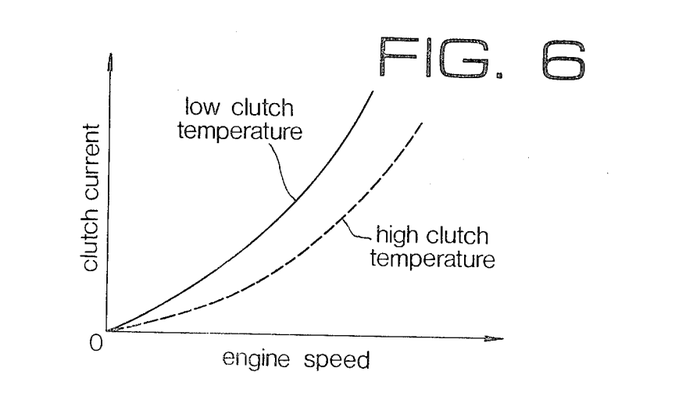
FIG. 6 is a graph showing the relationship between clutch current and engine speed of a conventional system.

The variation of clutch current of the conventional control system 40 is illustrated in FIG. 5. The clutch current is at a zero level while the accelerator pedal is not depressed and the accelerator switch 42 is off. When the accelerator switch 42 is turned on, the clutch current rises substantially in proportion to the engine speed. When the vehicle runs faster than the predetermined speed, the clutch current reaches rated clutch current so that the electromagnetic powder clutch 1 is entirely engaged. Under the ordinary condition when the clutch temperature is low, the clutch current varies as the solid line in FIG. 5 and FIG. 6. But, when the clutch temperature is high and the resistance of the coil 7 is raised, the clutch current varies as the broken line because of the increase of the resistance. Since the clutch current increases slowly at a high temperature, the clutch slips for a term longer than at low temperature, which will cause further temperature increase and current decrease.

In consideration of the above-described defects, the system of the present invention is provided with an overheat check means of electromagnetic clutch for controlling the clutch temperature and clutch current.

Figure 7:
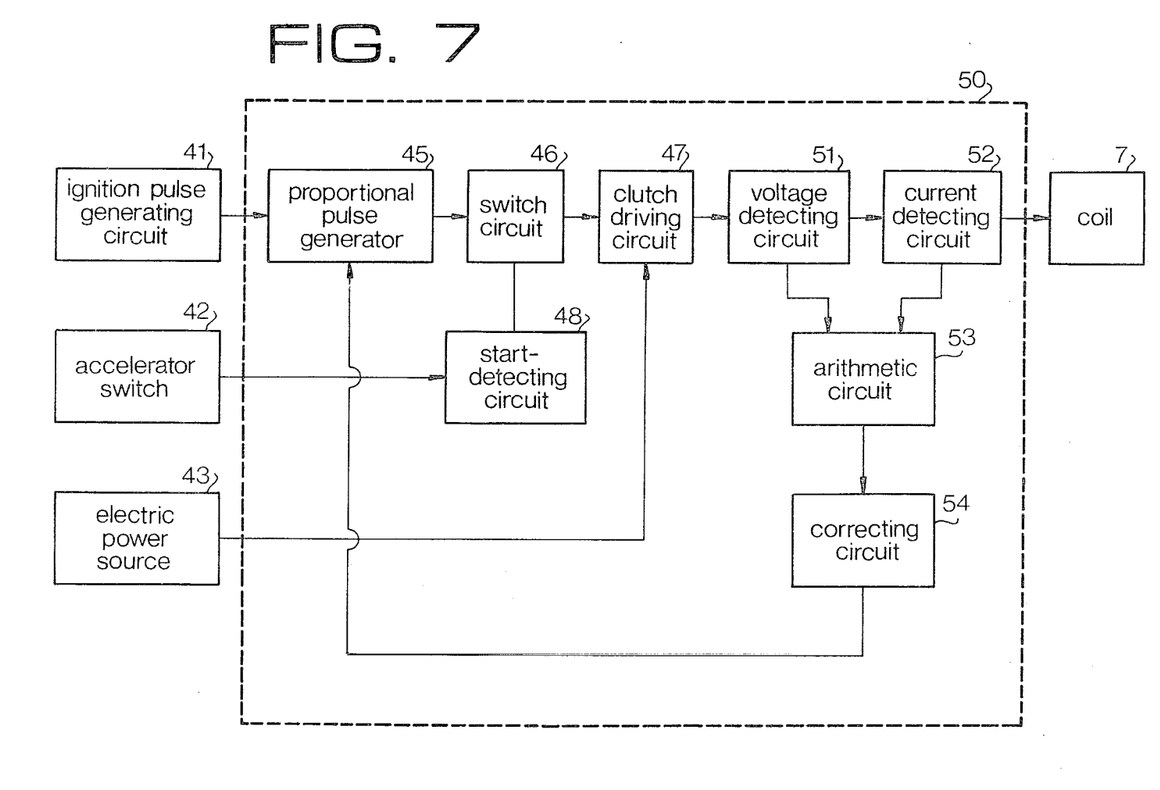
FIG. 7 is a block diagram showing a control system of the present invention.

An embodiment of the present invention will be hereinafter described with reference to FIG. 7 showing a controlling system 50 of the present invention. In the figure, the same parts as in the conventional system 40 of FIG. 4 are designated by same numerals. A voltage detecting circuit 51 and a current detecting circuit 52 are provided for detecting the clutch current. Both of the outputs from the detecting circuits 51 and 52 are applied to an arithmetic circuit 53, an output from which is applied to the proportional pulse generator 45 through a correcting circuit 54.

Operation of the present invention will be explained as follows.

As described above, when the accelerator switch 42 is turned on, signal output is sent from the start-detecting circuit 48 to the switch circuit 46 to pass pulses from the proportional pulse generator 45 to the clutch driving circuit 47. Voltage detecting circuit 51 and current detecting circuit 52 respectively detect the voltage and current of the electric current passing through the coil 7 and produce output signals to the arithmetic circuit 53 where the signals are calculated to obtain a value regarding the resistance of the coil 7. That is to say, the temperature of the clutch is represented by the resistance of the coil. The variation of resistance obtained by the arithmetic circuit 53 is transmitted to the correcting circuit 54 which produces a correcting signal corresponding to the resistance, that is the temperature variation, and transmit it to the proportional pulse generator 45. Pulse width of the pulse produced by the proportional pulse generator 45 is changed in accordance with the correcting signal from the correcting circuit 54.

Figure 10:
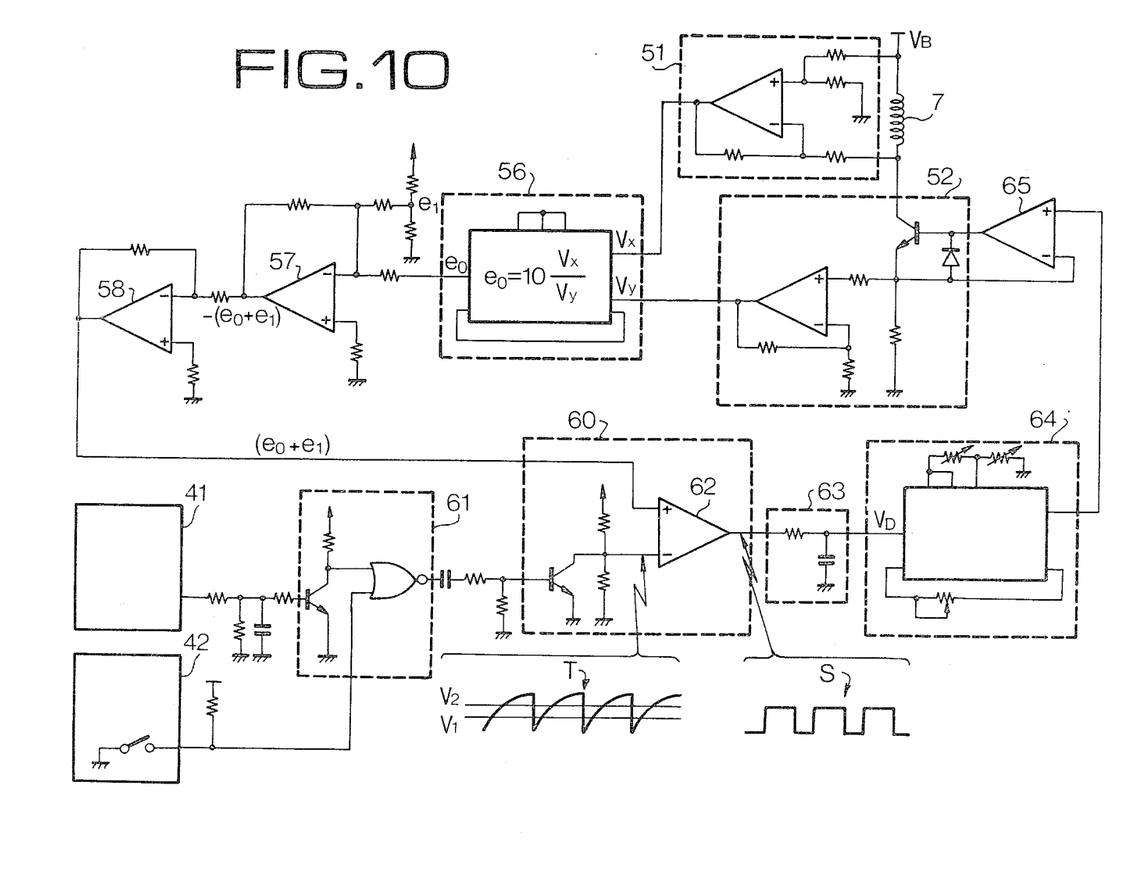
FIG. 10 is a circuit of an embodiment of the present invention.

FIG. 10 shows a circuit of the present invention. The voltage detecting circuit 51 and current detecting circuit 52 are arranged to detect the voltage and current of the electric current passing through the coil 7. Outputs of both circuits 51 and 52 are applied to a divider 56 (such as Model 433 of Analog Device Corp.) where calculation of $$e_0 = 10(V_x/V_y)$$

is made.

The output $e_0$ of the divider 56 is a value relative to the resistance of the coil 7. An adjusting value $e_1$ and the output $e_0$ are added by an operational inverting adder 57. The output $-(e_0+e_1)$ is inverted by an inverting operational amplifier 58.

Figure 9:
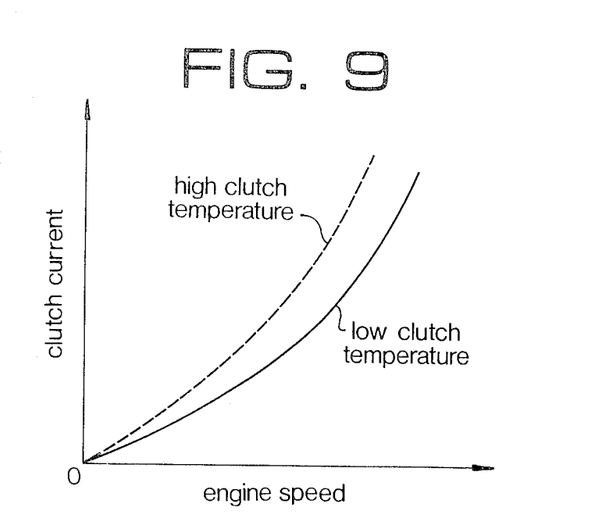
FIG. 9 is a graph showing the relationship between clutch current and engine speed of the present invention.

Outputs of the ignition pulse generating circuit 41 and accelerator switch 42 are applied to a monostable multivibrator 60 through a gate circuit 61. Triangular wave pulses "T" and the output $(e_0+e_1)$ of the amplifier 58 are applied to a comparator 62, so that square wave pulses "S" are produced. Pulse width of the pulse "S" is decided by level of the input $V_i=(e_0+e_1)$ at the non-inverting input of the comparator 62. When the resistance of the coil 7 is high, the input $V_i$ is high, and hence the width of the pulse is wide. The pulse "S" is integrated by an integrator 63 for obtaining a direct current level. The direct current voltage $V_D$ is applied to a calculating circuit 64 (for example Model 433 of Analog Device Corp.), where calculation of $V_D{}^m$ is made for obtaining a characteristic as shown in FIG. 9. The output of the calculating circuit 64 is applied to an operational amplifier 65 to control the clutch current.

Figure 8:
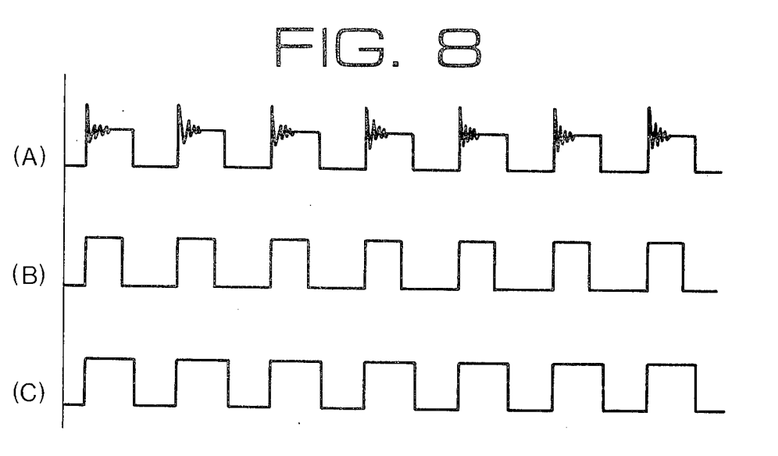
FIG. 8 is a graph showing the output waveform from a proportional pulse generator.

FIG. 8 illustrates input signals and output signals applied in and produced from the proportional pulse generator 45. In the figure, (A) is the signal which is an output from the ignition pulse generating circuit 41 as an input signal to the proportional generator 45; (B) is the output waveform from the proportional pulse generator in a normal condition; (C) is the output waveform from the proportional pulse generator when temperature of the coil 7 is elevated. The pulse width of (C) becomes wider correspondingly to the elevation of temperature of the coil 7. Therefore, as shown in FIG. 9, the relationship between clutch current and engine speed varies such that the clutch current increases as the coil temperature rises. Thus, it is possible to adjust the clutch current in relation to the temperature of the clutch during the half engagement clutch condition. Thus, the half engagement clutch period can be shortened, whereby the elevation of clutch temperature may be prevented. The preventing operation is more reliably and quickly effected compared with the method by buzzar warning.

What is claimed is:

1. A system for preventing overheat of an electromagnetic clutch for an internal combustion engine mounted on a vehicle, which has a drive member secured to a crankshaft of said internal combustion engine, a magnetizing coil provided in said drive member, a driven member adjacent to said drive member, and a transmission secured to said driven member, comprising
   detecting means for detecting the temperature of said clutch for producing an electrical output signal relative to the temperature;
   circuit means for controlling the clutch current passing through said coil so as to increase with the increase of the engine speed; and
   a correcting circuit responsive to said output signal from said detecting means for rapidly increasing the clutch current.

2. A system for preventing overheat of an electromagnetic clutch for an internal combustion engine according to claim 1 wherein said detecting means comprises a voltage detecting circuit and a current detecting circuit for detecting the voltage and current of the clutch current, and an arithmetic circuit for producing an output relative to the resistance of said coil by calculating outputs of both said detecting circuits.

3. A system for preventing overheat of an electromagnetic clutch for an internal combustion engine according to claim 1 wherein said circuit means comprises an ignition pulse generating circuit and a monostable multivibrator for producing square pulses in response to the engine speed.

* * * * *